(12) United States Patent
Peng et al.

(10) Patent No.: US 11,667,540 B2
(45) Date of Patent: Jun. 6, 2023

(54) MANUFACTURING METHOD OF TITANIUM DIOXIDE SOLUTION AND TITANIUM DIOXIDE FILM

(71) Applicant: Ming Chi University of Technology, New Taipei (TW)

(72) Inventors: Kun-Cheng Peng, New Taipei (TW); Chun-Ying Lee, New Taipei (TW); Kuan-Ting Wu, New Taipei (TW); Chen-Wei Chu, New Taipei (TW); Yan-Chen Lin, New Taipei (TW)

(73) Assignee: Ming Chi University of Technology, New Taipei (TW)

( * ) Notice: Subject to any disclaimer, the term of this patent is extended or adjusted under 35 U.S.C. 154(b) by 0 days.

(21) Appl. No.: 17/535,596

(22) Filed: Nov. 25, 2021

(65) Prior Publication Data
US 2022/0281755 A1 Sep. 8, 2022

(30) Foreign Application Priority Data
Mar. 4, 2021 (TW) .................................. 110107742

(51) Int. Cl.
| | |
|---|---|
| *C01G 23/053* | (2006.01) |
| *B01J 21/06* | (2006.01) |
| *B05D 1/02* | (2006.01) |
| *B01J 37/02* | (2006.01) |
| *B01J 35/00* | (2006.01) |

(52) U.S. Cl.
CPC .......... *C01G 23/0536* (2013.01); *B05D 1/02* (2013.01); *B01J 21/063* (2013.01); *B01J 35/004* (2013.01); *B01J 37/0215* (2013.01); *B05D 2203/30* (2013.01); *C01P 2002/52* (2013.01)

(58) Field of Classification Search
CPC .............. C01G 23/0536; C01G 23/053; C01G 23/047; B05D 1/02; B01J 21/063; B01J 35/004; B01J 37/0215
USPC ......................................................... 423/610
See application file for complete search history.

(56) References Cited

FOREIGN PATENT DOCUMENTS

CN          101947459 A    *  1/2011

OTHER PUBLICATIONS

Machine translation of CN 101947459 A originally published Jan. 2011 to Ai et al. (Year: 2011).*
Anicai et al., Electrochemical synthesis of nanosized TiO2 nanopowder involving choline chloride based ionic liquids, 2015, Materials Science and Engineering B, 199, pp. 87-95 (Year: 2015).*

* cited by examiner

*Primary Examiner* — Stefanie J Cohen
*Assistant Examiner* — Ritu S Shirali

(57) ABSTRACT

The manufacturing method of titanium dioxide solution includes: mixing choline chloride, urea, boric acid, and titanium tetrachloride to form a first solution, wherein a molar concentration ratio of choline chloride to urea is 1:2, a molar concentration of titanium tetrachloride is 0.2 M to 0.4 M, and weight/volume of boric acid is 5 g/300 ml to 15 g/300 ml; and heating the first solute ion to form a second solution, wherein the second solution contains carbon/nitrogen doped titanium dioxide. In the manufacturing method of the present disclosure, the deep eutectic solution formed by choline chloride and urea may be used as a solvent, and may also be used as a carbon source and/or a nitrogen source. Therefore, titanium dioxide may be doped with carbon and/or nitrogen during the formation process.

8 Claims, 17 Drawing Sheets

S10 — mixing choline chloride, urea, boric acid, and titanium tetrachloride to form a first solution, wherein a molar concentration ratio of choline chloride to urea is 1:2, a molar concentration of titanium tetrachloride is within 0.2 M to 0.4 M, weight/volume of boric acid is from 5 g/ 300 ml to 15 g/ 300 ml S11 — heating the first solution to form a second solution, wherein the second solution comprises carbon/nitrogen doped titanium dioxide S10 — mixing choline chloride, urea, boric acid, and titanium tetrachloride to form a first solution, wherein a molar concentration ratio of choline chloride to urea is 1:2, a molar concentration of titanium tetrachloride is within 0.2 M to 0.4 M, weight/volume of boric acid is from 5 g/ 300 ml to 15 g/ 300 ml S11 — heating the first solution to form a second solution, wherein the second solution comprises carbon/nitrogen doped titanium dioxide

FIG. 1

MANUFACTURING METHOD OF TITANIUM DIOXIDE SOLUTION AND TITANIUM DIOXIDE FILM

CROSS REFERENCE TO RELATED DISCLOSURE

This application claims the priority benefit of Taiwan Patent Application Number TW110107742, filed on Mar. 4, 2021, the full disclosure of which is incorporated herein by reference.

BACKGROUND

Technical Field

The present disclosure is related to a titanium dioxide, and in particular, a manufacturing method of titanium dioxide solution and titanium dioxide film.

Related Art

Titanium dioxide is a semiconductor material with a energy bandgap of 3.2 eV. According to Planck-Einstein equation, titanium dioxide performs a photocatalytic reaction and activates the surrounding oxygen and water molecules under the illumination of ultraviolet (UV) light. Therefore, titanium dioxide as a photocatalyst may be employed in sanitary products for disinfection, sterilization, and deodorization purposes.

Furthermore, the titanium dioxide may also perform a photocatalytic reaction under the visible light by ion-doping. However, with the current technology, the manufacturing of carbon/nitrogen doped titanium dioxide is usually via sintering at high temperature. The high temperature process not only consumes high energy but also makes the grains of titanium dioxide too coarse, which deteriorates the photocatalytic effect.

SUMMARY

The embodiments of the present disclosure disclose a manufacturing method of titanium dioxide solution and titanium dioxide film, in order to solve the problem that the current manufacturing method consumes high energy and makes the grains of titanium dioxide too coarse.

In order to solve the above technical problems, the present disclosure is implemented as follows.

First, a manufacturing method of titanium dioxide solution is provided. The manufacturing method includes: mixing choline chloride, urea, boric acid, and titanium tetrachloride to form a first solution, wherein a molar concentration ratio of choline chloride to urea is 1:2, a molar concentration of titanium tetrachloride is within 0.2 M to 0.4 M, weight/volume of boric acid is within 5 g/300 ml to 15 g/300 ml; and heating the first solution to form a second solution, wherein the second solution contains titanium dioxide.

Second, a manufacturing method of titanium dioxide film is provided. The manufacturing method includes: mixing choline chloride, urea, boric acid, and titanium tetrachloride to form a first solution, wherein a molar concentration ratio of choline chloride to urea is 1:2, a molar concentration of titanium tetrachloride is within 0.2 M to 0.4 M, weight/volume of boric acid is within 5 g/300 ml to 15 g/300 ml; heating the first solution to form a second solution, wherein the second solution contains titanium dioxide; mixing the second solution and alcohol solution to form a third solution; spraying the third solution on a substrate; and drying the sprayed substrate to obtain a titanium dioxide film on the substrate.

In the disclosure, the deep eutectic solution formed by mixing choline chloride and urea not only may be used as a solvent but may also be a source of carbon and nitrogen. Therefore, the titanium dioxide is doped with carbon and/or nitrogen during the manufacturing process thereof. Moreover, the carbon/nitrogen doped titanium dioxide has a lower energy bandgap than pure titanium dioxide. The photocatalytic effect under visible light may be achieved by the carbon/nitrogen doped titanium dioxide. Furthermore, the manufacturing method of the present disclosure may be performed at a low temperature to solve the problem that the high temperature process consumes high energy and makes the grains of titanium dioxide too coarse.

BRIEF DESCRIPTION OF THE DRAWINGS

The figures described herein are used to provide a further understanding of the present disclosure and constitute a part of the present disclosure. The exemplary embodiments and descriptions of the present disclosure are used to illustrate the present disclosure and do not limit the present disclosure, in which:

FIG. 1 is the flowchart of the manufacturing method of the titanium dioxide solution according to the first embodiment of the present disclosure;

DETAILED DESCRIPTION OF THE EMBODIMENTS

Figure 2:
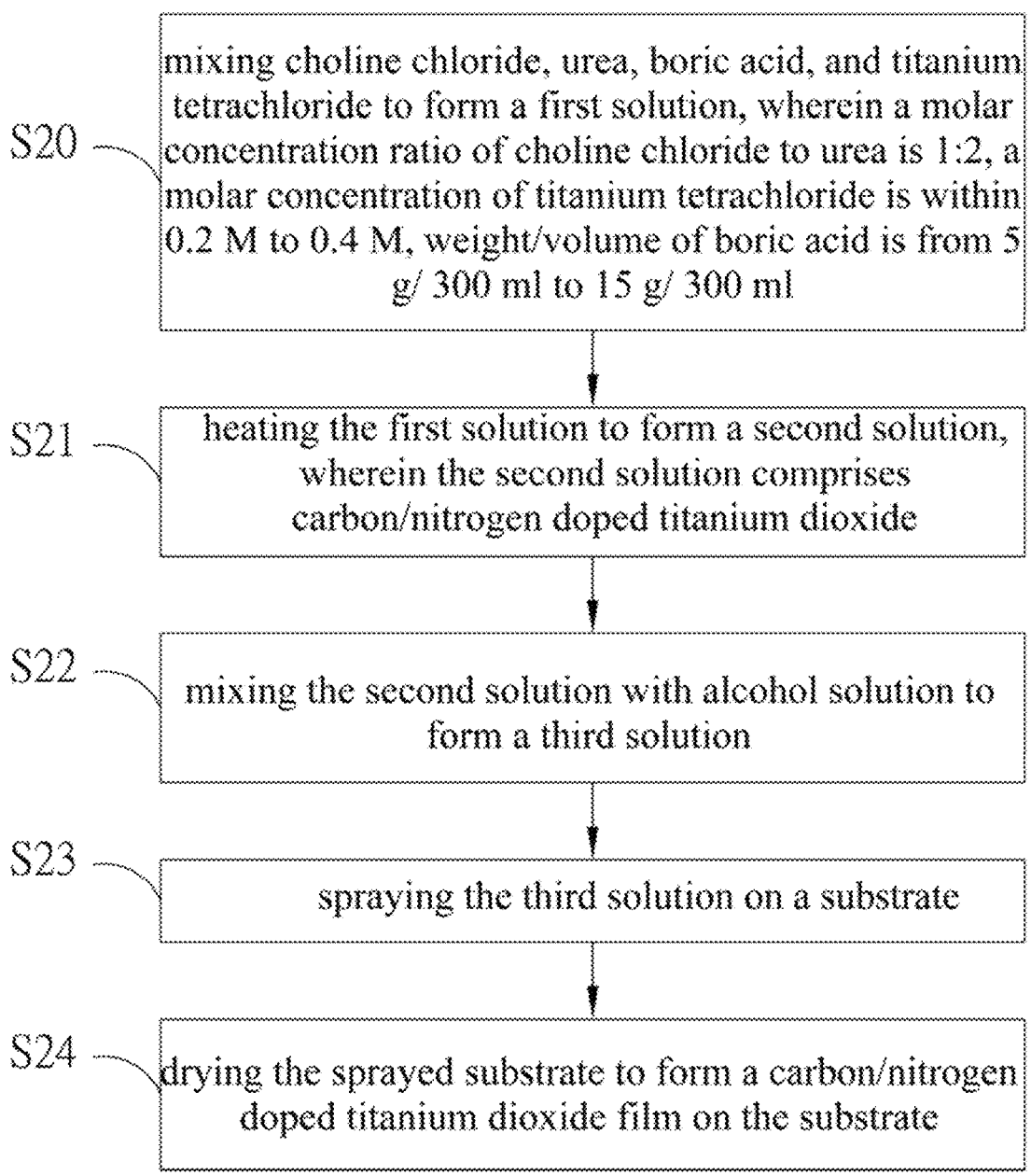
FIG. 2 is the flowchart of the manufacturing method of the titanium dioxide film according to the first embodiment of the present disclosure.

In order to make the objectives, technical solutions, and advantages of the present disclosure clearer, the technical solutions of the present disclosure will be described clearly and completely in conjunction with specific embodiments and the figures of the present disclosure. Obviously, the described embodiments are only a part of the embodiments of the present disclosure, rather than all the embodiments.

Based on the embodiments in the present disclosure, all other embodiments obtained by a person of ordinary skill in the art without creative work fall within the protection scope of this disclosure.

The following description is of the best-contemplated mode of carrying out the present disclosure. This description is made for the purpose of illustrating the general principles of the present disclosure and should not be taken in a limiting sense. The scope of the present disclosure is best determined by reference to the appended claims.

FIG. 1 is the flowchart of the manufacturing method of titanium dioxide solution according to an embodiment of the present disclosure. As shown in the figure, the manufacturing method of titanium dioxide solution includes:

Step S10: mixing choline chloride, urea, boric acid, and titanium tetrachloride to form a first solution, wherein a molar ratio of choline chloride to urea is 1:2, a molar concentration of titanium tetrachloride is within 0.2 M to 0.4 M, and weight/volume of the boric acid is 5 g/300 ml to 15 g/300 ml.

In some embodiments, the hotplate with a magnetic stirrer may be used to mix the composition mentioned above, i.e. choline chloride, urea, boric acid, and titanium tetrachloride, to form the first solution. However, the present disclosure is not limited thereto. Any mixing devices recognized to a person of ordinary skill in the art may be applied in the present disclosure. Hereinafter, each composition in the first solution will be explained in detail to make the characteristics of the present disclosure more clear.

In this embodiment, the purpose of adding choline chloride and urea is to form deep eutectic solvent (DES). Moreover, the mixture of choline chloride and urea with a specific ratio is liquid at room temperature. More specifically, when the molar ratio of choline chloride and urea is 1:2, this DES has the lowest melting temperature of 12° C. In some embodiment, 560 g (i.e. 4 moles) of choline chloride and 480 g (i.e. 8 moles) of urea may be mixed and be heated to 80° C. to form the DES.

In addition, choline chloride and urea may be used as the source of carbon and/or nitrogen. Therefore, titanium dioxide may be doped with carbon and/or nitrogen during the manufacturing thereof. Moreover, by doping with carbon and/or nitrogen, the energy bandgap of titanium dioxide may be lower than 3.2 eV. Thus, titanium dioxide may perform the photocatalytic effect under visible light.

In this embodiment, the purpose of adding titanium tetrachloride is to provide a source of titanium ions. That is, the titanium tetrachloride may release titanium ions and chlorine ions, and the titanium ions is reacted with the oxygen ions to form titanium dioxide. In some embodiments, the molar concentration of titanium tetrachloride may be within 0.2 M to 0.4 M. For example, the molar concentration of titanium tetrachloride is 0.2 M, 0.25 M, 0.3 M, 0.35 M, 0.4 M, or a range between any combination of the values mentioned above. Wherein, the preferred ratio of titanium tetrachloride with the first solution is 60 g/300 ml, or about 0.3 M in molar concentration.

In this embodiment, the purpose of adding boric acid is to stabilize the pH value of the first solution, i.e. adjust the concentration of hydrogen ions. The first solution after adding boric acid becomes weakly acidic and has a pH value of about 4. In some embodiments, the weight/volume of boric acid may be within 5 g/300 ml, 7.5 g/300 ml, 10 g/300 ml, 12.5 g/300 ml, 15 g/300 ml, or a range between any combination of the concentrations mentioned above. Wherein, the preferred ratio of boric acid with the first solution is 10 g/300 ml.

In some embodiments, the first solution may contain ascorbic acid. The purpose of adding ascorbic acid is to eliminate the oxygen bubbles in the first solution. The weight/volume of ascorbic acid may be within 0.5 g/300 ml to 1.5 g/300 ml. For example, the ratio of ascorbic acid with the first solution is 0.5 g/300 ml, 0.75 g/300 ml, 1.0 g/300 ml, 1.25 g/300 ml, 1.5 g/300 ml, or a range between any combination of the values mentioned above. Wherein, the preferred ratio of ascorbic acid with the first solution is 1.0 g/300 ml.

Step S11: heating the first solution to form a second solution. The second solution contains carbon/nitrogen doped titanium dioxide.

In some embodiments, the heating temperature may be within 50° C. to 70° C. For example, the first solution may be heated at 50° C., 55° C., 60° C., 65° C., 70° C., or a range between any combination of the values mentioned above to change titanium tetrachloride of the first solution to titanium dioxide. Compared to manufacturing the carbon/nitrogen doped titanium dioxide by the sintering method, the present disclosure may perform the reaction at a lower temperature. In the case of reducing energy consumption, the grain growth of titanium dioxide due to high temperatures may also be avoided.

As mentioned above, in some embodiments, the synthetic reaction of titanium dioxide may be $TiCl_4 + 2H_2O \rightarrow TiO_2 + 4HCl$. Wherein, the water may be the moisture in the air. That is, the reaction of the present disclosure may be performed of atmosphere, and titanium tetrachloride may be reacted with the moisture in the air. Alternatively, in other embodiments, titanium tetrachloride may be reacted with choline chloride, urea, and boric acid to form the carbon/nitrogen doped titanium dioxide.

Furthermore, the second solution mainly consists of ionic liquid. In some embodiments, the second may contain no water. In other words, the second solution containing the carbon/nitrogen doped titanium dioxide may remain moist at room temperature to prolong the service life thereof.

FIG. 2 is the flowchart of the manufacturing method of the titanium dioxide film according to the first embodiment of the present disclosure. As shown in the figure, the manufacturing method of the titanium dioxide film includes:

Step S20: mixing choline chloride, urea, boric acid, and titanium tetrachloride to form a first solution, wherein a molar ratio of choline chloride to urea is 1:2, a molar concentration of titanium tetrachloride is within 0.2 M to 0.4 M, and weight/volume of the boric acid is within 5 g/300 ml to 15 g/300 ml.

Step S21: heating the first solution to form a second solution, wherein the second solution contains carbon/nitrogen doped titanium dioxide.

In this embodiment, Step S20 may be the same as or similar to Step 10, and Step S21 may be the same as or similar to Step 11. Therefore, the detailed descriptions thereof are omitted.

Step S22: mixing the second solution and alcohol solution to form a third solution.

In some embodiments, the hotplate with a magnetic stirrer may be used to mix the second solution and the alcohol solution to form the third solution. However, the present disclosure is not limited thereto. Any mixing devices recognized to a person of ordinary skill in the art may be applied in the present disclosure.

In some embodiments, the second solution mainly consists of the ionic liquid formed by mixing choline chloride and urea. The ionic liquid has polarity. That is, the ionic liquid has high viscosity. Therefore, an solution may be added to the second solution to dilute the second solution. The volumetric concentration of alcohol of the alcohol solution may be within 60% to 95%. For examples, the volumetric concentration of alcohol may be 60%, 65%, 70%, 75%, 80%, 85%, 90%, 95%, or a range between any combination of the values mentioned above. Wherein, the preferred volumetric concentration of alcohol is 75%.

Step S23: spraying the third solution on a substrate.

In some embodiments, the spraying method may be jet spray, dot spray, brush spray, immersion spray, or atomization spray. However, the present disclosure is not limited thereto. Any spray method recognized to a person of ordinary skill in the art may be applied in the present disclosure.

Step S24: drying the sprayed substrate to form a carbon/nitrogen doped titanium dioxide film on the substrate.

In some embodiments, the drying method may be natural drying method or artificial drying method. For example, the artificial drying method may be conductive drying, convective drying, or radiative drying, but not limited thereto.

Hereinafter, the titanium dioxide film manufactured by the present disclosure will be discussed. Wherein, the process parameters of the first embodiment and the second embodiment are shown in Table 1. In addition, the heating temperature shown in Table 1 represents the temperature for forming the second solution.

TABLE 1

| Item | First embodiment | Second embodiment |
|---|---|---|
| Choline chloride | 560 g | 560 g |
| Urea | 480 g | 480 g |
| Titanium tetrachloride | 60 g | 60 g |
| Boric acid | 30 g | 30 g |
| Ascorbic acid | 3.3 g | 0 g |
| Heating temperature | 60° C. | 60° C. |

Figure 3:
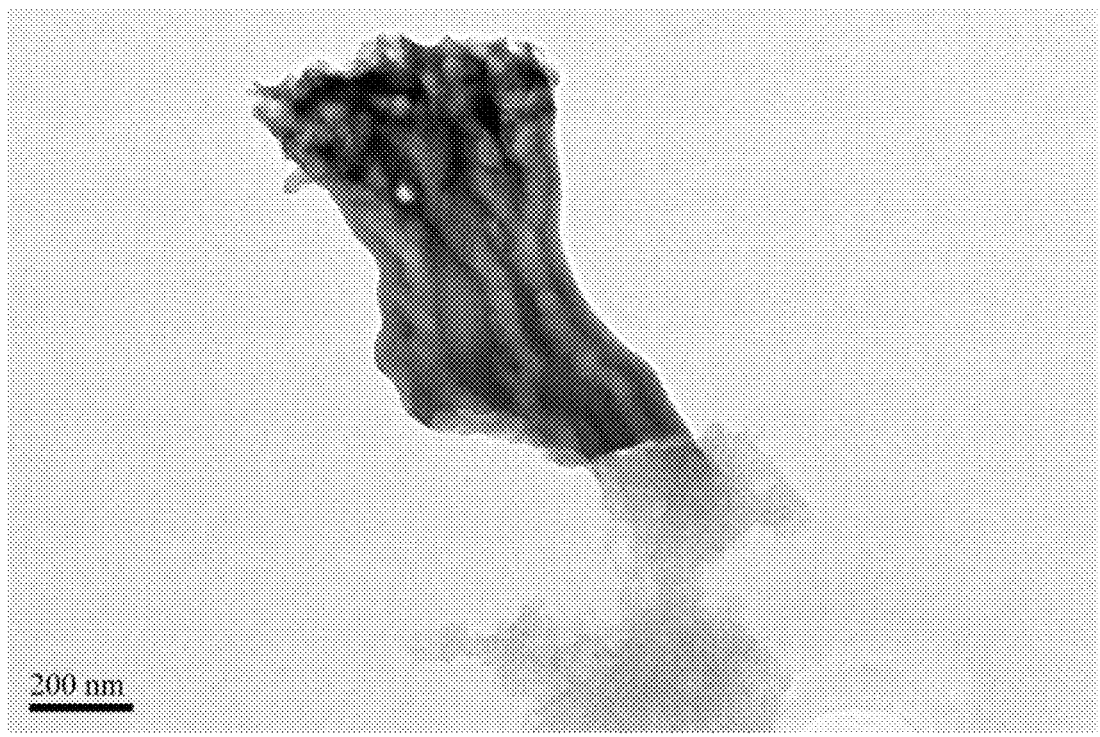
FIG. 3 to FIG. 5 respectively are the cross-sectional TEM morphologies of the titanium dioxide film according to the first embodiment of the present disclosure.
Figure 4:
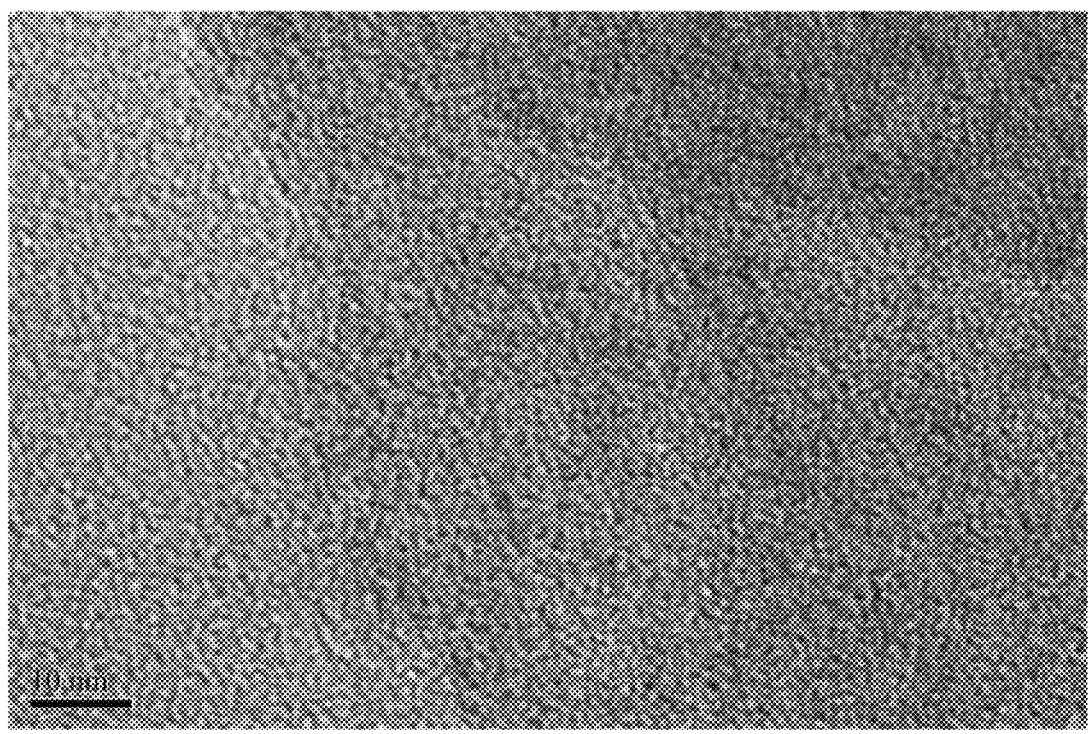
Figure 5:
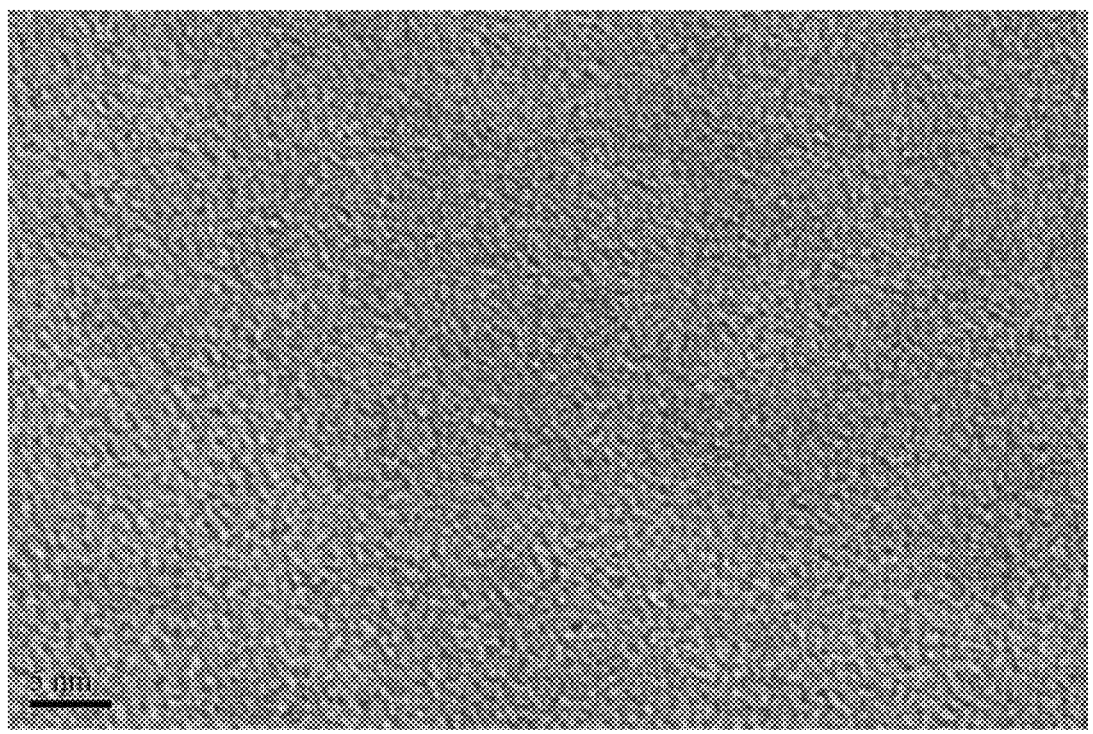
Figure 6:
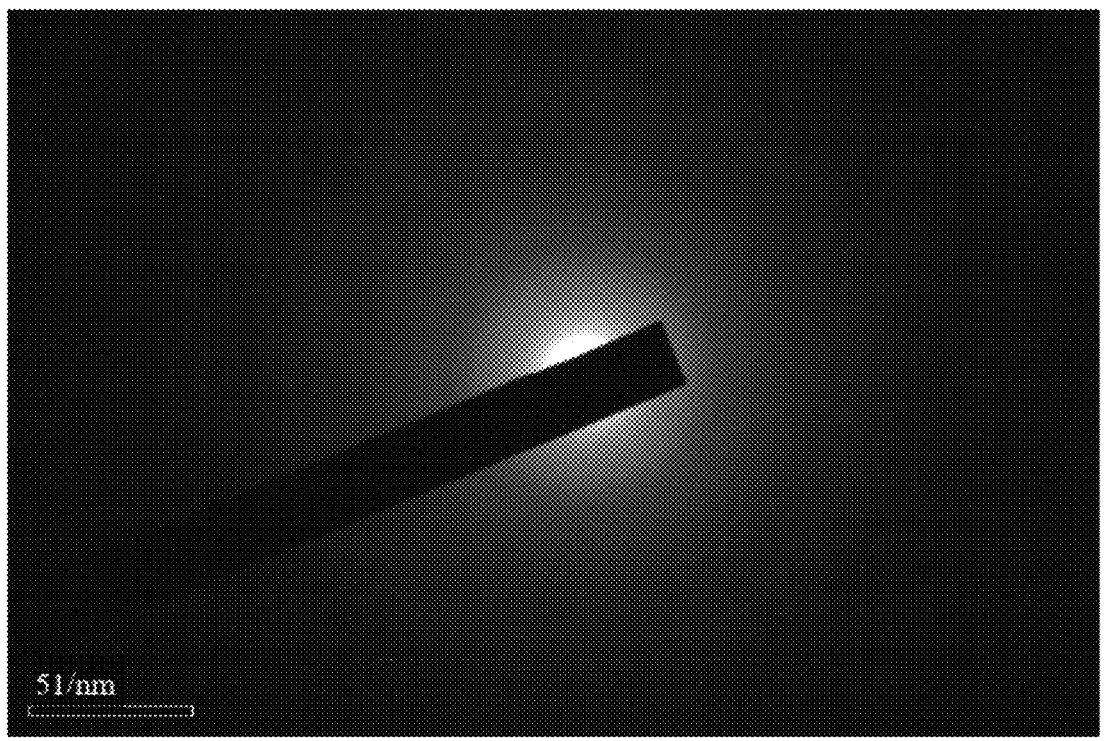
FIG. 6 is the electron diffraction pattern of the titanium dioxide film according to the first embodiment of the present disclosure.
Figure 7:
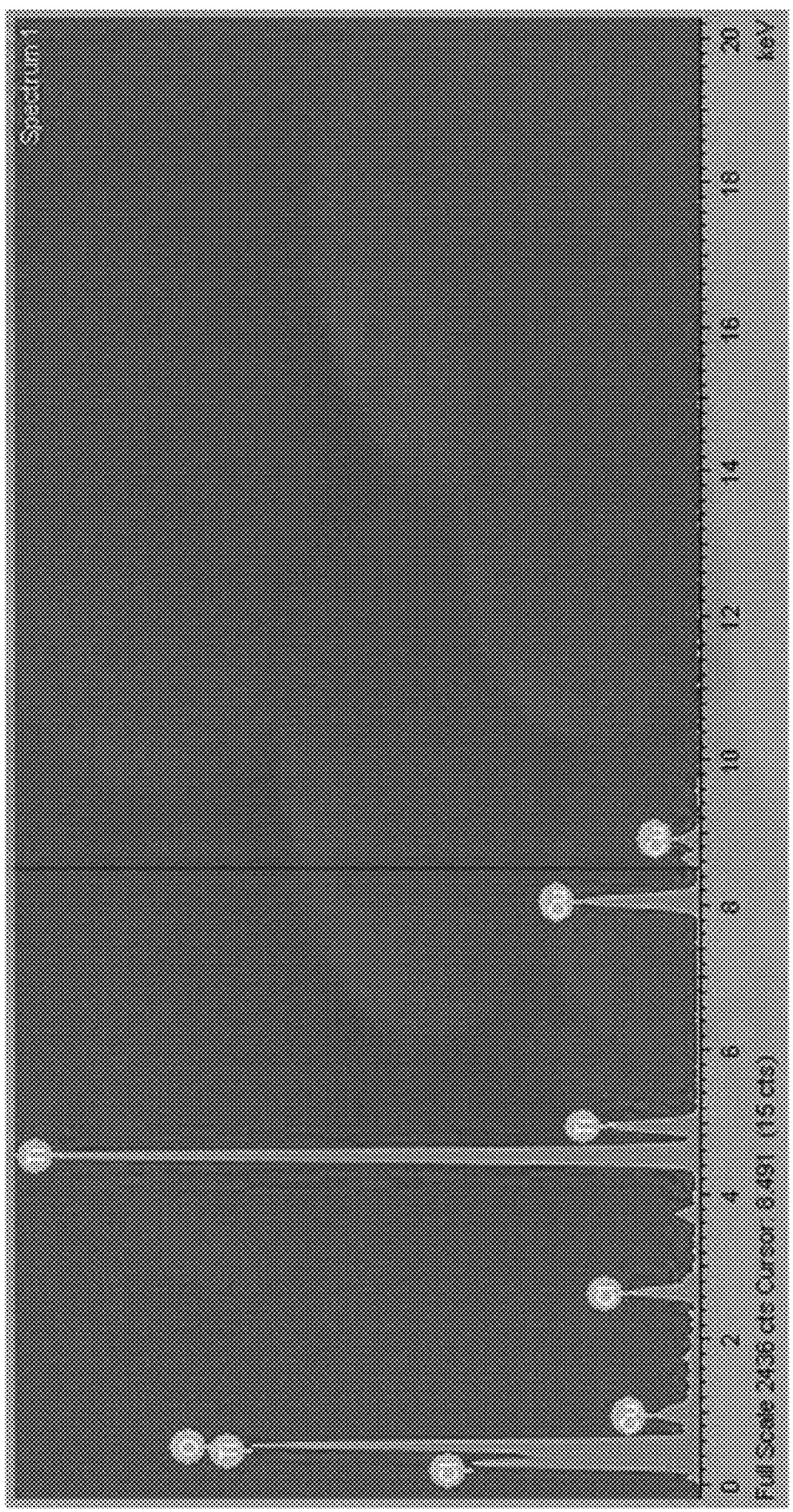
FIG. 7 is the compositional analysis result of the titanium dioxide film according to the first embodiment of the present disclosure.

FIG. 3 to FIG. 7 are the cross-sectional TEM morphologies, electron diffraction pattern, and compositional analysis result of the titanium dioxide film of the first embodiment of the presnet disclosure. More specifically, FIG. 3 is the cross-sectional TEM morphology with 12 k magnification, FIG. 4 is the cross-sectional TEM morphology with 250 k magnification, and FIG. 5 is the cross-sectional TEM morphology with 400 k magnification. As shown in FIG. 3 to FIG. 5, the cross-section of the titanium dioxide film is delicate and without obviously crack or bump. As shown in FIG. 6, in the TEM electron diffraction pattern, the titanium dioxide film is amorphous. As shown in FIG. 7, the EDS compositional analysis (by TEM) shows that titanium exists in the film formed from the third solution.

Figure 8:
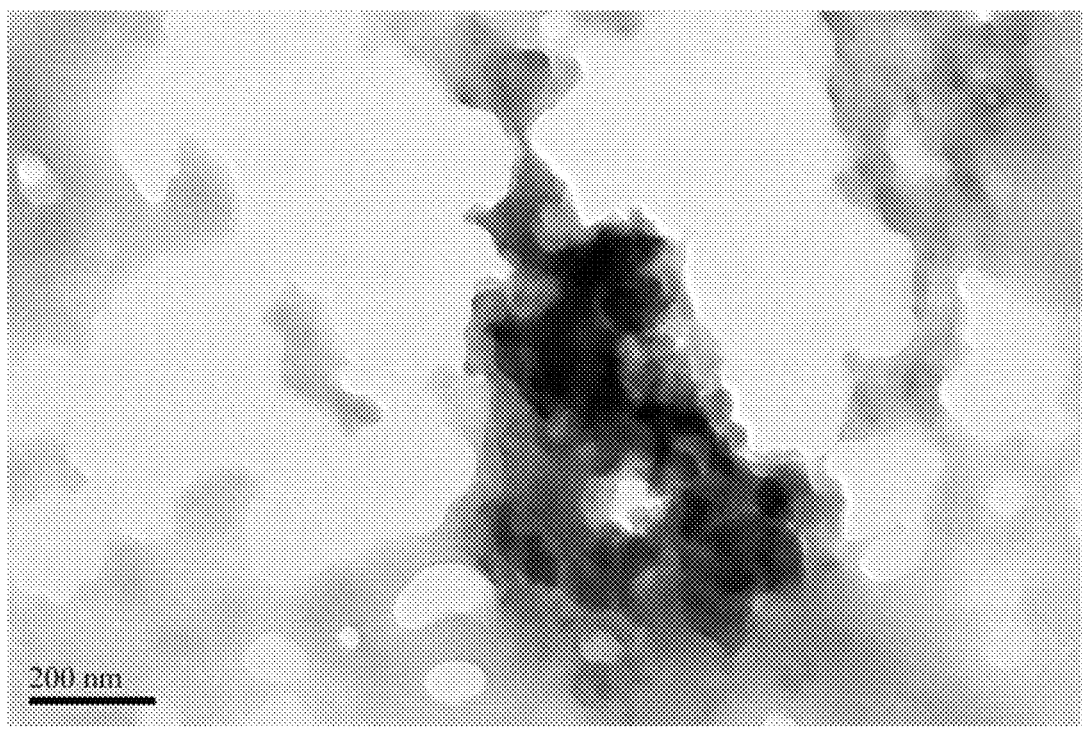
FIG. 8 to FIG. 11 respectively are the cross-sectional TEM morphologies of the titanium dioxide film according to the second embodiment of the present disclosure.
Figure 9:
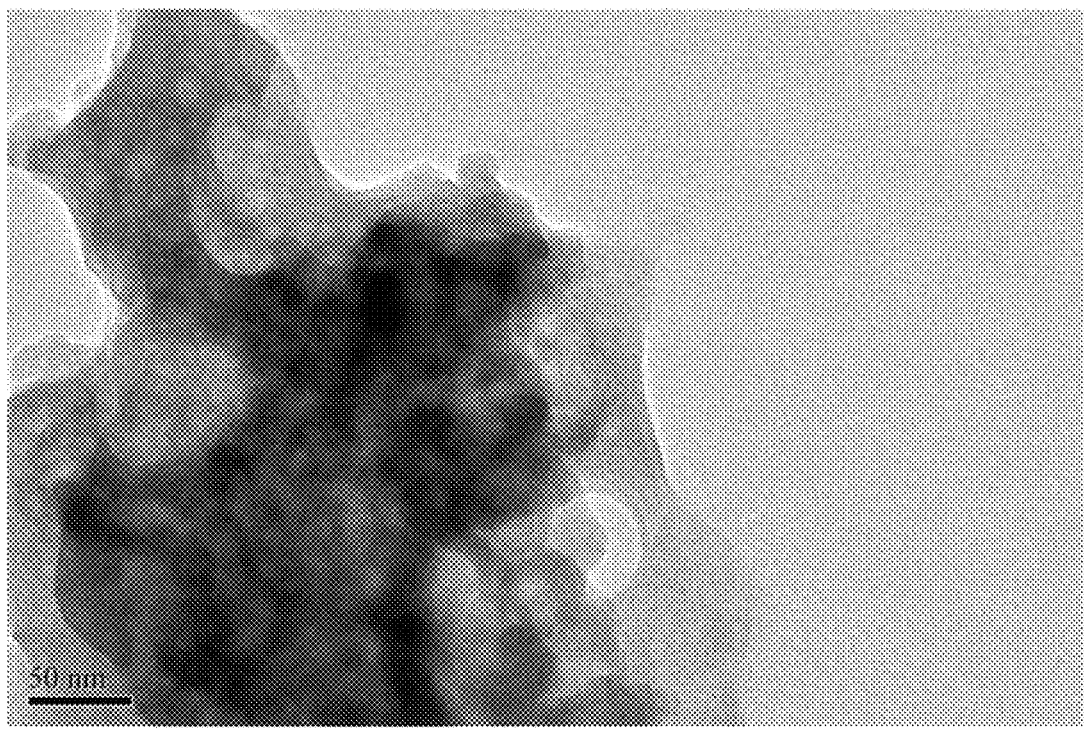
Figure 10:
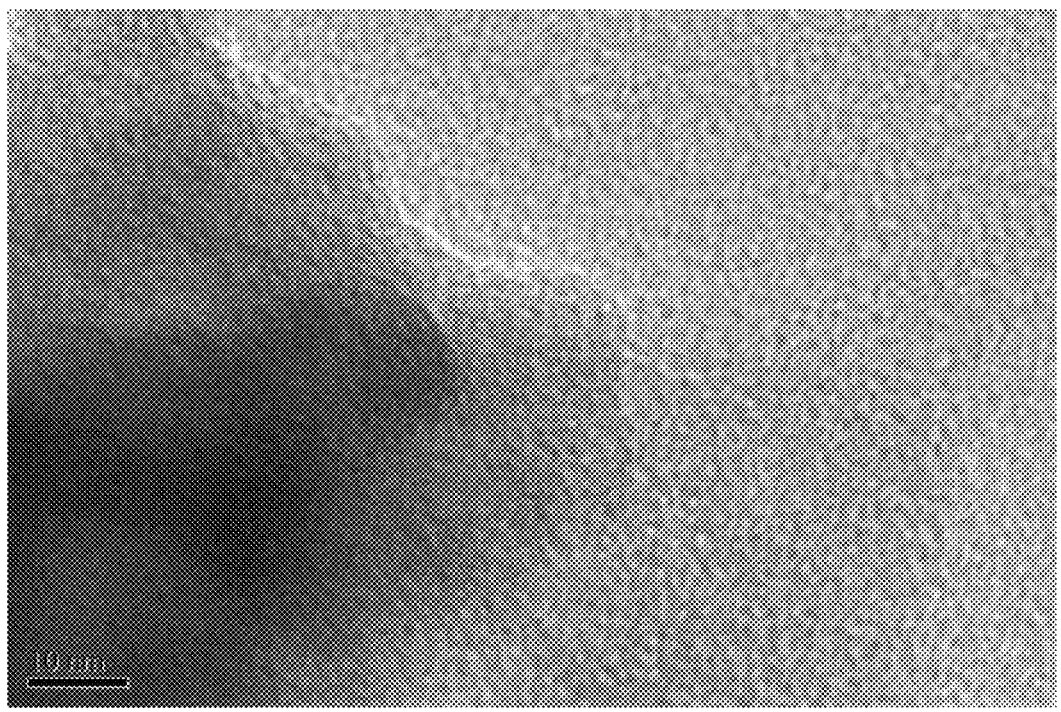
Figure 11:
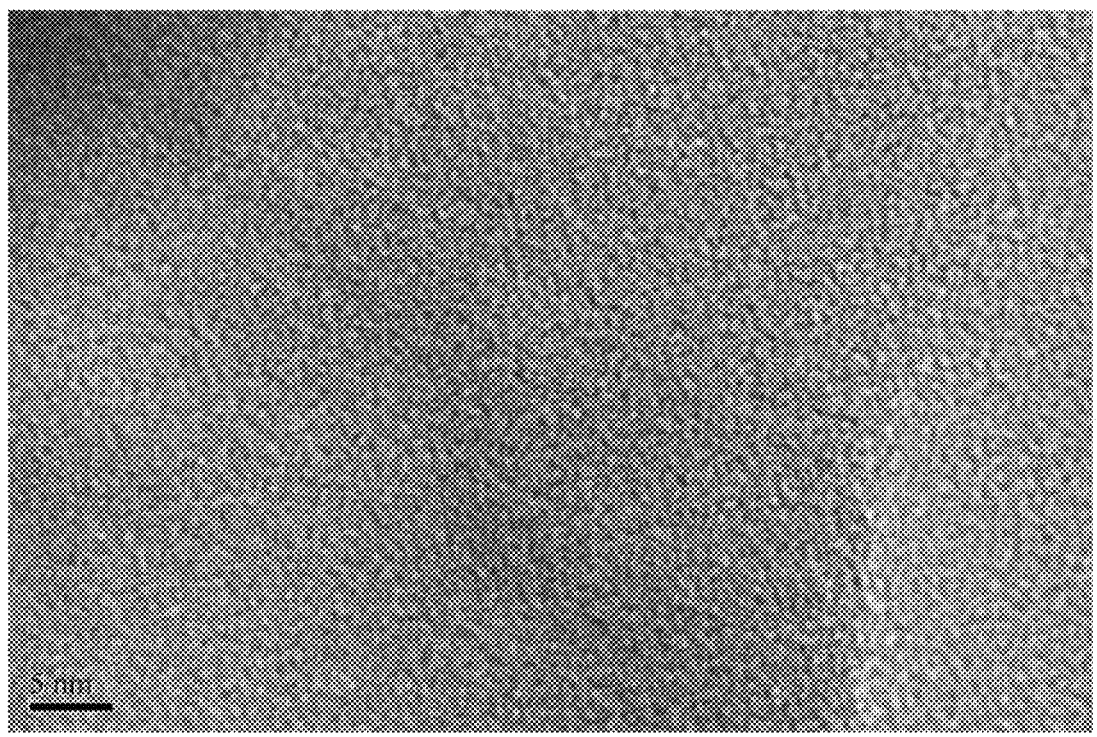
Figure 12:
FIG. 12 is the electron diffraction pattern of the titanium dioxide film according to the second embodiment of the present disclosure.
Figure 13:
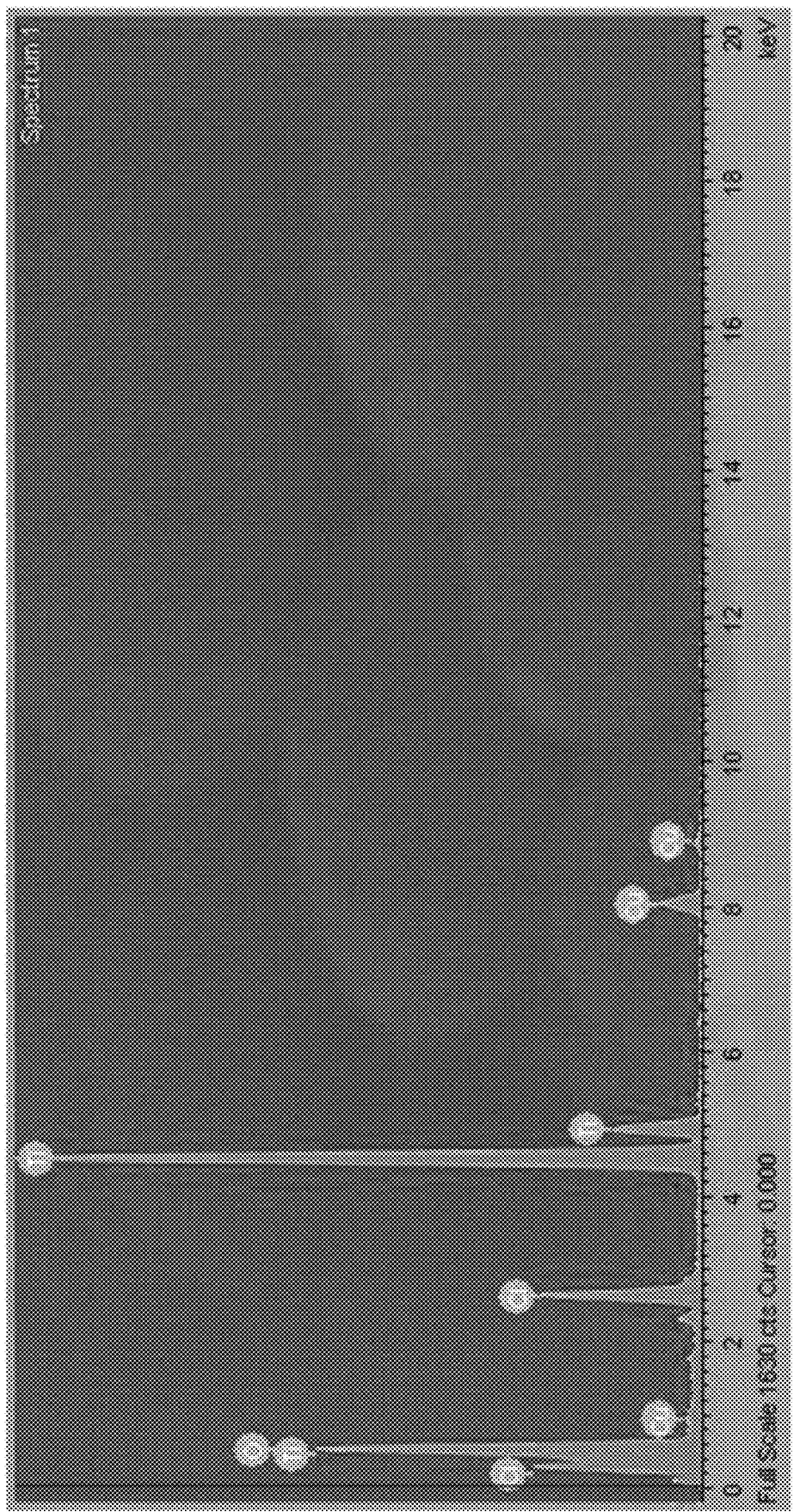
FIG. 13 is the compositional analysis result of the titanium dioxide film according to the second embodiment of the present disclosure.

FIG. 8 to FIG. 13 are the cross-sectional TEM morphologies, electron diffraction pattern, and compositional analysis result of the titanium dioxide film of the second embodiment of the presnet disclosure. More specifically, FIG. 8 is the cross-sectional TEM morphology with 15 k magnification, FIG. 9 is the cross-sectional TEM morphology with 50 k magnification, FIG. 10 is the cross-sectional TEM morphology with 250 k magnification, and FIG. 11 is the cross-sectional TEM morphology with 400 k magnification. As shown in FIG. 8 to FIG. 11, the cross-section of the titanium dioxide film is delicate and without obviously crack or bump. As shown in FIG. 12, in the TEM electron diffraction pattern, the titanium dioxide film is amorphous. As shown in FIG. 13, the EDS compositional analysis (by TEM) shows that titanium exists in the film formed from the third solution.

Therefore, the analysis results from the first embodiment and the second embodiment both show that titanium dioxide film may be formed at a low temperature by the manufacturing methods of the present disclosure. Wherein, the SEM analysis results of the titanium dioxide film are shown hereinafter.

Figure 14:
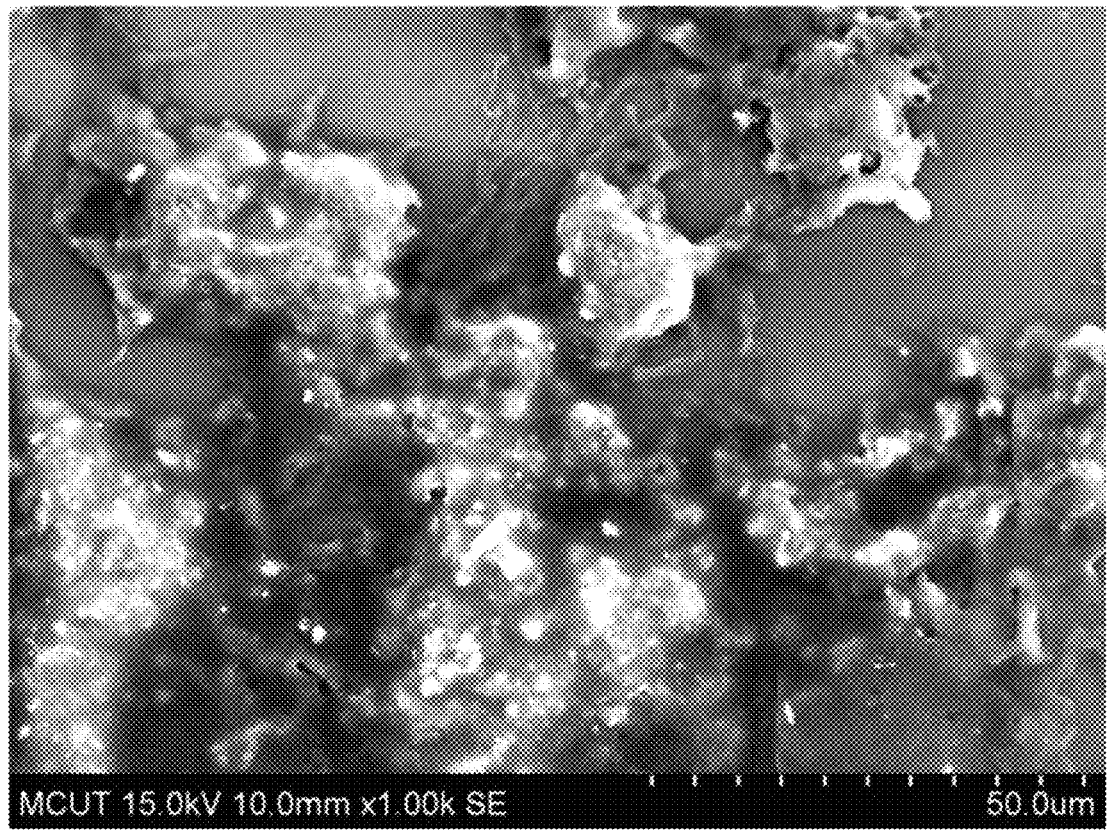
FIG. 14 to FIG. 16 respectively are the surface SEM morphologies of the titanium dioxide film according to the third embodiment of the present disclosure.
Figure 15:
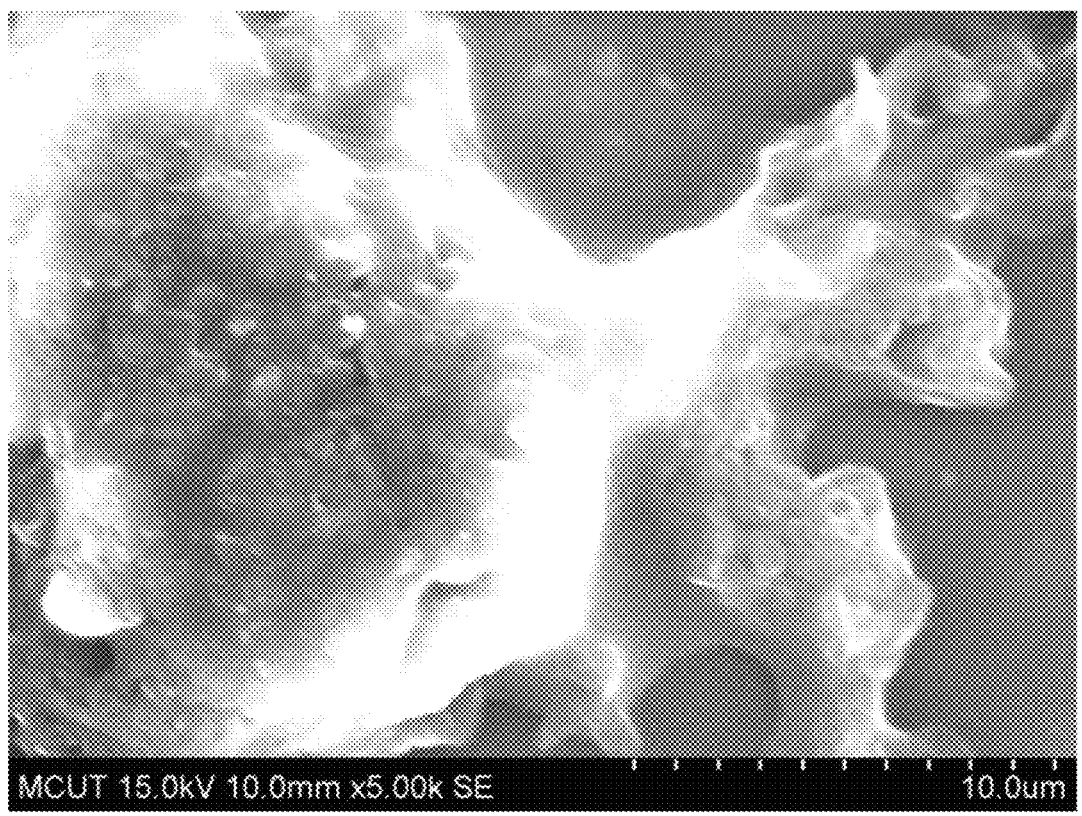
Figure 16:
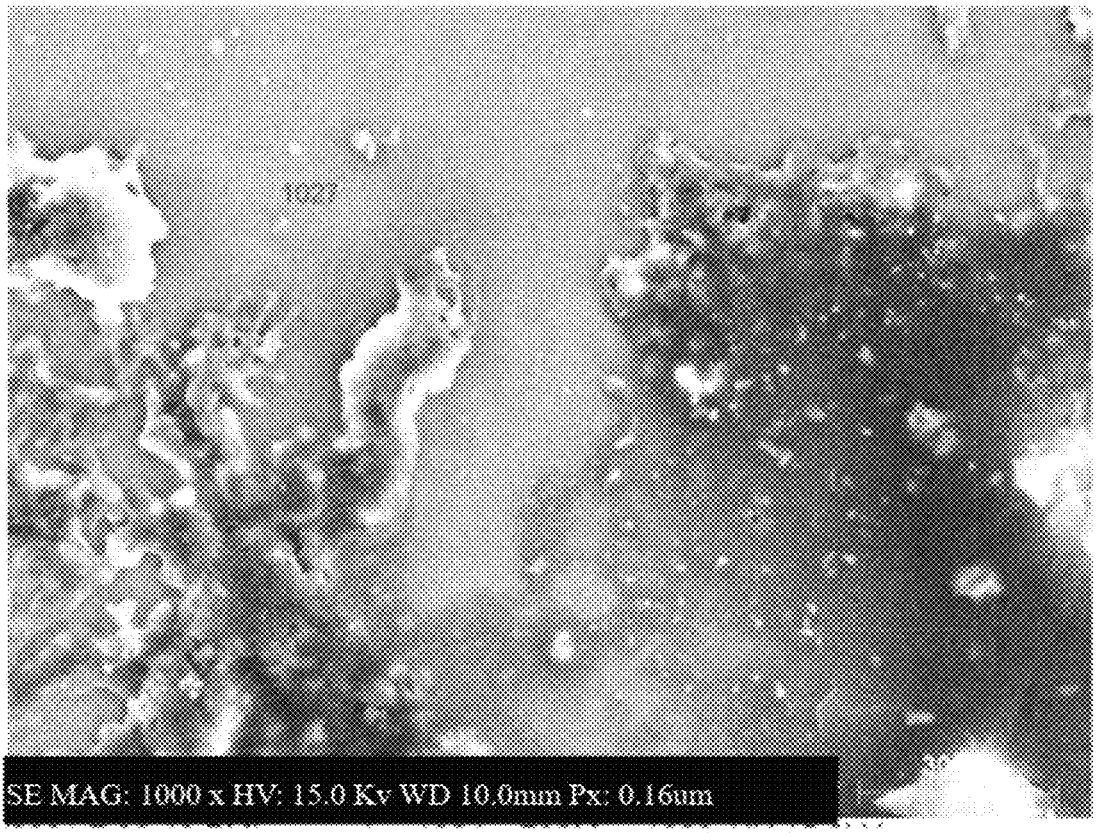
Figure 17:
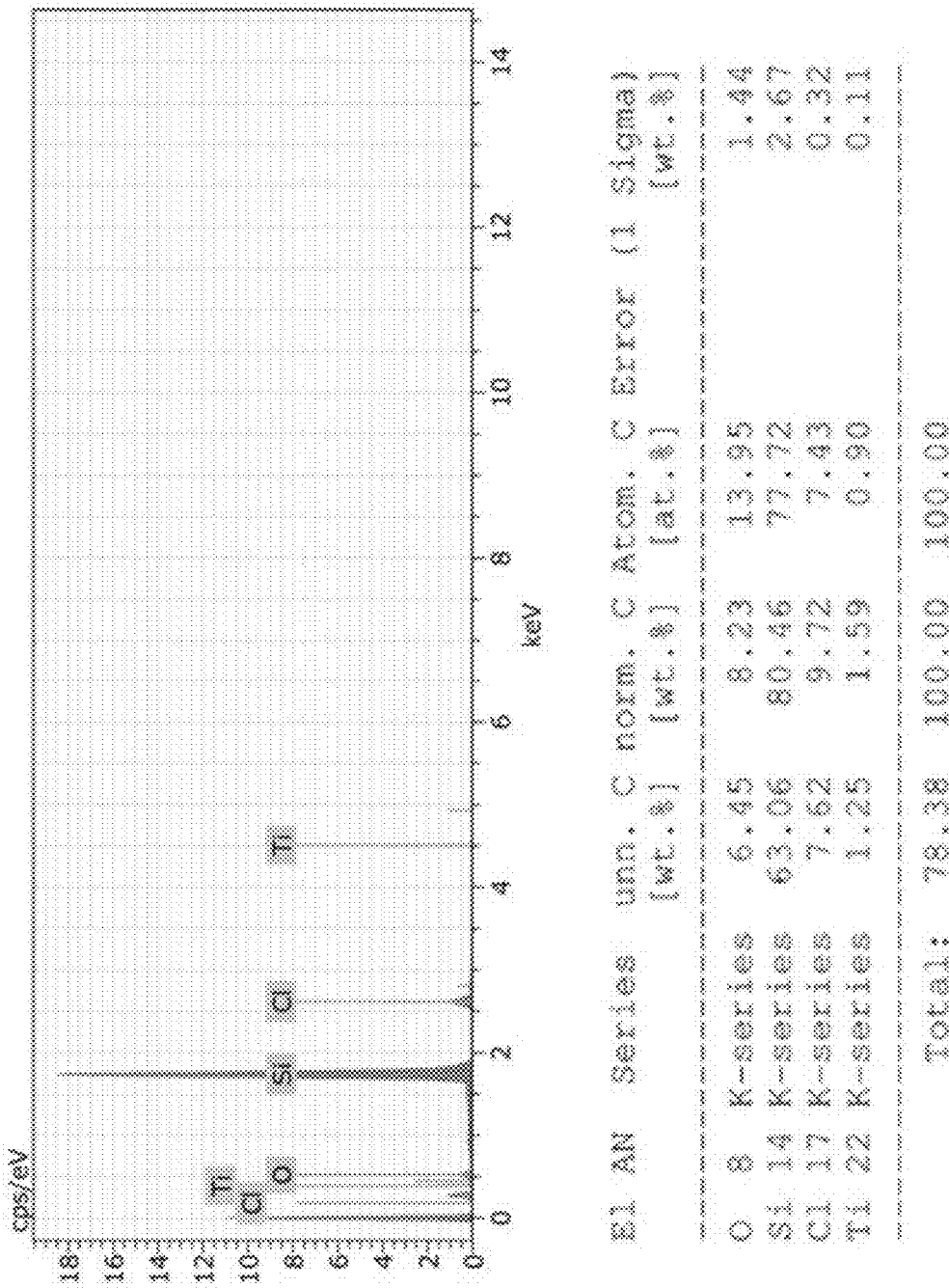
FIG. 17 is the compositional analysis result of the titanium dioxide film according to the third embodiment of the present disclosure.

FIG. 14 to FIG. 17 are the surface SEM morphologies and compositional analysis result of the titanium dioxide film of the third embodiment of the presnet disclosure. Wherein, the substrate of this embodiment is a silicon substrate, and the titanium dioxide film is attached thereto. More specifically, FIG. 14 is the surface SEM morphology with 5 k magnification, FIG. 15 is the surface SEM morphology with 1 k magnification, and FIG. 17 is the compositional analysis result of FIG. 16. As shown in FIG. 14 and FIG. 15, the titanium dioxide film (dark zone) is attached to the silicon substrate (bright zone) and covered more than half of the substrate's surface. As shown in FIG. 17, the EDS compositional analysis result (by SEM) shows the existence of titanium dioxide.

Furthermore, to obviously show the effectiveness of the present disclosure, an antifungal test was performed on the titanium dioxide film of the first embodiment. The parameters thereof are shown in Table 2.

TABLE 2

| Light source | Visible | Ultraviolet |
|---|---|---|
| Specifications | LED, 4.0 VDC, 3 W | Wavelength 254 nm |
| Exposure duration | 240 hr | 240 hr |
| Heat generation | Yes | Yes |
| Water condensation | Yes | Yes |
| Fungi death | Yes | Yes |

As shown in Table 2, the carbon/nitrogen doped titanium dioxide film of the present disclosure may perform the photo-catalytic effect under visible light and exterminate the fungi.

The present disclosure may also be applied practically in the treatment of construction wall infected with fungus. For example, a disinfection test was performed by spraying the third solution of the embodiment on the wall to form titanium dioxide film and illuminating afterwards with indoor lighting such as fluorescent light. After a certain time duration, e.g. 7 days, the titanium dioxide film of the present disclosure generated an obvious disinfection effect, and the disinfection effect is dependent of the locations. More specifically, the wall coated with the titanium dioxide film of the present disclosure may achieve a nearly 100% disinfection of the fungi on the wall by suitable exposure to lighting.

It has been revealed in the literature that the particle size of the titanium dioxide should be less than 7 nm to perform the photo-catalytic effect. In other words, that the test result of the present disclosure matches the teaching in the literature. That is, the manufactured titanium dioxide film of the present disclosure contains nanosized grains, and the photo-catalytic effect may be achieved. Furthermore, the involved stepwise reactions in the photo-catalytic agent are shown as follows:

$$TiO_2 + h\upsilon \rightarrow h^+ + e^-$$

$$H_2O + h^+ \rightarrow OH^- + e^-$$

$$O_2 + e^- \rightarrow O^{2-}$$

In more details, when the titanium dioxide exposes to lighting, oxygen atom of the surface leaves the particle surface of the titanium dioxide. Subsequently, the water molecule occupies the oxygen vacancies and expels the proton to form the hydroxyl group. The surface with hydroxyl groups may have hydrophilicity and self-cleaning effects. That is, the titanium dioxide film of the present disclosure may be applied in fungus disinfection and hydrophilic self-cleaning.

In summary, the deep eutectic solution formed by mixing choline chloride and urea not only may be used as a solvent but may also be a source of carbon and nitrogen. Therefore, the titanium dioxide is doped with carbon and/or nitrogen during the manufacturing process thereof. Moreover, the carbon/nitrogen doped titanium dioxide may lower has a lower energy bandgap than pure titanium dioxide. The photocatalytic effect under visible light may be achieved by the carbon/nitrogen doped titanium dioxide. Furthermore, the manufacturing method of the present disclosure may be performed at a low temperature to solve the problem that the high temperature process consumes high energy and makes the grains of titanium dioxide too coarse.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A manufacturing method of titanium dioxide solution, comprising:

mixing choline chloride, urea, boric acid, and titanium tetrachloride to form a first solution, wherein a molar concentration ratio of choline chloride to urea is 1:2, a molar concentration of titanium tetrachloride in the first solution is within 0.2 M to 0.4 M, weight/volume of boric acid in the first solution is from 5 g/300 ml to 15 g/300 ml; and heating the first solution to form a second solution, wherein the second solution comprises carbon/nitrogen doped titanium dioxide.

2. The manufacturing method of titanium dioxide solution of claim 1, wherein in the step of heating the first solution to form the second solution, heating temperature is within 50° C. to 70° C.

3. The manufacturing method of titanium dioxide solution of claim 1, wherein the first solution further comprises ascorbic acid.

4. The manufacturing method of titanium dioxide solution of claim 3, wherein weight/volume of ascorbic acid in the first solution is within 0.5 g/300 ml to 1.5 g/300 ml.

5. A manufacturing method of titanium dioxide film, comprising:

mixing choline chloride, urea, boric acid, and titanium tetrachloride to form a first solution, wherein a molar concentration ratio of choline chloride to urea is 1:2, a molar concentration of titanium tetrachloride in the first solution is within 0.2 M to 0.4 M, weight/volume of boric acid in the first solution is from 5 g/300 ml to 15 g/300 ml;

heating the first solution to form a second solution, wherein the second solution comprises carbon/nitrogen doped titanium dioxide;

mixing the second solution with alcohol solution to form a third solution;

spraying the third solution on a substrate; and drying the sprayed substrate to form a carbon/nitrogen doped titanium dioxide film on the substrate.

6. The manufacturing method of titanium dioxide film of claim 5, wherein in the step of heating the first solution to form the second solution, heating temperature is within 50° C. to 70° C.

7. The manufacturing method of titanium dioxide film of claim 5, wherein the first solution further comprises ascorbic acid.

8. The manufacturing method of titanium dioxide solution of claim 7, wherein weight/volume of the ascorbic acid in the first solution is within 0.5 g/300 ml to 1.5 g/300 ml.

* * * * *